Patented Feb. 6, 1945

2,369,057

UNITED STATES PATENT OFFICE 2,369,057

PROCESS FOR TREATING ACRYLIC RESINS

Richard E. Leary, Newark, and Barnard M. Marks, Upper Montclair, N. J., assignors to E. I. du Pont de Nemours & Company, Wilmington, Del., a corporation of Delaware No Drawing. Application September 26, 1941, Serial No. 412,484

5 Claims. (Cl. 18—48)

This invention relates to the treatment of shaped masses comprising synthetic resins and more particularly, to the production of such shaped masses free from voids.

The production of shaped masses comprising synthetic resins may be effected by such processes as molding, extrusion, or casting. In U. S. P. 2,101,107 and 2,120,006, of Daniel E. Strain, there is disclosed a process of molding compositions comprising synthetic resins in which there is present a monomer which serves as a plasticizer or solvent to facilitate the shaping of the resin, but which upon continued application of heat is polymerized so that if the heating be continued for an appropriate period, no monomeric ingredient remains. Similarly, rods may be formed by the extrusion of a mass comprising a synthetic resin and having a sufficient content of monomer to facilitate the extrusion. The step of heating the extruded rods to effect the polymerization of the monomer is most conveniently conducted by immersing them directly into hot water maintained under pressure. The pressure serves to prevent the development of bubbles in the mass which would otherwise result from the temperature applied or from the exothermic reaction of polymerization, and permits the use of temperatures which are sufficiently high so that the polymerization may be made to proceed at a rapid rate. Temperatures as high as 140° C. or more, under pressures as high as 3000 pounds per square inch or more, may be used. An undesirable result of this procedure has been the development of opacification in the surface layers of the material being treated. When it is desired that the finished rod or other object be of the utmost transparency, it then becomes necessary to remove the cloudy outside layers by machining or grinding which is obviously undesirable.

Similar treatment with hot water under pressure applied to shaped masses comprising synthetic resins already substantially completely polymerized causes superficial opacification of the resin, as has been described in U. S. P. 2,238,446 of Glen M. Kuettel. This treatment serves also to cause the collapse and thus the eradication of internal voids in such masses resulting from defects in the technique of polymerization. When the treatment with hot water under pressure is applied for the purpose of removing voids only, the accompanying opacification will be objectionable, if flawless, transparent rods are desired.

It is the object of the present invention to provide a process of treating shaped masses comprising synthetic resins and having an appreciable monomer content, which has been added to facilitate the shaping of the mass, to effect the polymerization of the monomer, without producing opacification of the shaped mass, and without the support of a mold. It is a further object of the invention to provide a method of treatment of shaped masses comprising synthetic resins, in which there is no substantial content of monomer, to cause the collapse of internal voids in such masses, without causing opacification of the mass.

Other objects will appear hereinafter.

These objects are accomplished in accordance with the present invention by subjecting a shaped mass comprising a synthetic resin to an elevated temperature and simultaneously to pressure, while immersed in an aqueous solution of at least about 1.5 molar strength, of a water-soluble substance inert to the material being treated.

When the object of the treatment is to collapse internal voids in a mass of syntheitc resin in which there is substantially no monomer content, the treatment comprises subjecting the mass to a temperature above the softening temperature of the resin, preferably above 100° C. and usually not over 150° C., and simultaneously to pressure adapted to effect the collapse of voids within the mass, while the mass is immersed in such a solution. Similarly, when the object of the treatment is to polymerize the monomer in a mass comprising a synthetic resin and having an appreciable monomer content, the treatment involves subjecting the mass to a temperature adapted to effect the polymerization of the monomer and, simultaneously, to sufficient pressure to prevent the formation of bubbles within the mass, while the whole mass is immersed in the solution.

While the treatment has been described as applicable to synthetic resins in general, it is particularly useful in the treatment of masses comprising polymerized esters of methacrylic acid and copolymers in which esters of methacrylic acid are the major component.

The water-soluble substances to be used in the aqueous solution will preferably be selected from the group comprising inorganic salts inert toward the material undergoing treatment, glycerine and sugar. By inertness toward the mass undergoing treatment is meant the absence of any chemical or solvent action thereon, under the conditions of the process. To meet this condition, it is necessary to exclude any substances which may in any way react chemically with the synthetic resin or with any auxiliary ingredient of the mass, such as plasticizers, lubricants, dyestuffs, etc., in such a way as to cause impairment of the quality of the mass. In practice, the choice of the water-soluble substance will be covered also by the desirability of avoiding corrosion of equipment.

The content of the water-soluble substance in its solution in water will be at least 1.5 molar, but will preferably be 2.5–3.5 molar, or even higher. In fact, glycerine may be used in very high concentrations and even in the substantial absence of water. Obviously, only those substances will be operative which are adequately soluble in water. Among the substances which satisfy the requirements may be included sodium chloride, sodium acetate, sodium sulphate, sodium thiosulphate, calcium chloride, magnesium chloride, magnesium sulphate, sodium alum, etc., as well as sugar and glycerine.

The temperatures applied in the treatment will depend upon the composition of the mass being treated. When the mass contains substantially no monomer and the purpose of the treatment is to remove voids, the temperature will necessarily be above the softening temperature of the mass and, ordinarily, will be preferably above 100° C. When the treatment involves the polymerization of a monomeric component of the mass, the temperature applied will be selected upon the basis of the facility with which the monomeric ingredient will polymerize. This may be largely dependent upon the selection and concentration of catalyst which may be present in the mass. In commercial operation, the temperature applied will ordinarily lie between about 40–150° C.

The magnitude of the pressure to be applied in accordance with the invention will be selected to effect the collapse of voids, or to prevent development of bubbles in the mass undergoing polymerization, as the case may be. The magnitude of the pressure to be used will be dependent upon the temperature used. In the application of the invention to the collapsing of voids within a mass which contains substantially no monomeric component, no chemical reaction is involved and the use of a higher temperature permits the use of a lower pressure, and vice versa, as in the conventional molding of thermoplastics. In the application of the invention to a mass containing appreciable amounts of monomer, to effect the polymerization of the monomer, the higher the temperature used the greater will be the tendency of the mass to develop bubbles as a result of the exothermic character of the polymerization and, therefore, the higher must the pressure be, in order to prevent the formation of bubbles. It will be obvious that the optimum temperature and pressure at a given instance will be influenced by the selection of the monomeric and polymeric components of the mixture, by the proportions of monomer and of polymer and by the facility with which the monomeric component is polymerized, which will, in turn, be influenced not only by the nature of the monomeric component but also by any polymerization catalyst which is present.

In the use of the process merely to collapse voids, the pressure will usually be in the range from 500 to 3000 pounds per square inch. In the use of the invention involving the polymerization of monomer, the pressure applied will normally be of the order of from about 100 to about 3000 pounds per square inch.

The procedure of the present invention has been found particularly applicable to the production and treatment of rods of polymerized methyl methacrylate. Where the rods have been produce by known methods but contain voids, the treatment provides an excellent means for treating imperfect rods containing voids to eliminate the voids, without obtaining the opacity which has accompanied previous attempts to eliminate flaws in such rods. Furthermore, the treatment of this invention provides a means of making practical a complete method of producing rods which otherwise would not be feasible. This method involves the extrusion of a composition comprising polymerized methyl methacrylate and monomeric methyl methacrylate, which is added to the polymer to make a sufficiently soft composition so that it may be readily extruded. The rods so produced and containing monomer may then be subjected to the treatment of this invention without the necessity of the support of molds and perfect rods containing no monomer will be obtained. Obviously, other polymers or monomers may be used in this process.

As will be understood by those skilled in the art, auxiliary ingredients may be present in the mass of shaped synthetic resin to be treated by the procedure of this invention. Such auxiliary ingredients may include plasticizers, pigments, fillers, dyestuffs, lubricants, and other modifiers.

The following examples are given to illustrate specific embodiments of the invention. The proportions recited are in parts by weight.

*Example 1*

Rods of substantially completely polymerized methyl methacrylate, which contain internal voids as a result of defective technique during their formation, are placed in an autoclave, and the door is closed. The interior is now filled with a hot aqueous 25 per cent. solution of sodium acetate (3.45 molar), and this remains in contact with the rods while being heated with jacket steam at 140° C. for 45 minutes. The solution is put under hydraulic pressure of 3000 pounds per square inch and the temperature is held at 140° C. for about ten minutes. Then the system is cooled, while still under pressure, until the rods have been carried below their softening temperature. Pressure is released, the autoclave is drained, and the rods are rinsed and dried. They are now free from internal voids, and free from opacification.

*Example 2*

Rods of substantially completely polymerized methyl methacrylate, which contain internal voids as a result of defective technique during their formation, are immersed in a 25 per cent. aqueous solution of sodium acetate (3.45 molar), maintained at a temperature of 140° C. and under a pressure of 3000 pounds per square inch, for 30 minutes. The system is then cooled, while still under pressure, and the rods removed and rinsed with water. Flawless, transparent rods are thus obtained.

*Example 3*

A homogeneous mixture of methyl methacrylate monomer, 39 parts, methyl methacrylate polymer, 61 parts, and dibutyl phthalate, 4 parts, containing, as catalyst of polymerization, benzoyl peroxide 0.5 part, is formed into a rod of 0.5 inch diameter by being extruded through a suitable die at a temperature insufficient to effect any substantial polymerization of the monomeric constituent. The resulting rod is immersed in a 20 per cent. solution of sodium acetate in water (2.69 molar) contained in an autoclave connected with a source of hydraulic pressure, and jacketed for heating. The solution is heated to 110° C., under pressure of 125 pounds per square inch for 1.5 hours. The monomeric constituent is thereby polymerized. The contents of the autoclave are then cooled to 60° C., i. e., below the softening temperature of the resulting resin. The rod removed from the autoclave, and rinsed, is completely transparent and contains no voids or bubbles.

Under the same conditions, there may be used instead of the 20 per cent solution of sodium acetate:

(a) A 30 per cent. solution of sodium acetate (4.23 molar), or
(b) A 20 per cent. solution of sodium thiosulphate (1.5 molar), or
(c) A 20 per cent. solution of sodium chloride (3.92 molar), or
(d) A 25 per cent. solution of sodium sulphate (2.19 molar), or
(e) A 20 per cent. solution of calcium chloride (2.12 molar), or
(f) A 55 per cent. solution of sugar (2.55 molar), or
(g) A 50 per cent. solution of glycerine (6.12 molar), or
(h) Commercial glycerine.

Example 4

The procedure of Example 3 is repeated, except that the temperature applied is 140° C., the pressure 3000 pounds per square inch, the duration of the treatment one hour, and a 30 per cent. solution of sodium acetate (3.66 molar) is used.

The procedures of Example 3 are applied to the following homogeneous mixtures:

Example 5

| | Parts |
|---|---|
| Glycol dimethacrylate monomer | 120 |
| Methyl methacrylate polymer | 180 |
| Benzoyl peroxide | 1.2 |

Example 6

| | Parts |
|---|---|
| Glycerol dimethacrylate monomer | 12.5 |
| Glycerol trimethacrylate monomer | 12.5 |
| Methyl methacrylate polymer | 75 |
| Benzoyl peroxide | 0.25 |

Example 7

| | Parts |
|---|---|
| Ethyl methacrylate monomer | 25 |
| Methyl methacrylate polymer | 75 |
| Benzoyl peroxide | 0.3 |

Example 8

| | Parts |
|---|---|
| Methyl methacrylate monomer | 10 |
| Isobutyl methacrylate monomer | 15 |
| Methyl methacrylate polymer | 75 |
| Benzoyl peroxide | 0.2 |

Example 9

| | Parts |
|---|---|
| Methyl methacrylate monomer | 40 |
| Methyl methacrylate polymer | 85 |
| Isobutyl methacrylate polymer | 15 |
| Benzoyl peroxide | 0.4 |

While the invention has been primarily described in respect to the production of rods from synthetic resins, it is obviously applicable to the production of masses of any other shape.

As many apparently widely different embodiments of this invention may be made without departing from the spirit and scope thereof, it is to be understood that the invention is not limited to the specific embodiments thereof except as defined in the appended claims.

We claim:

1. A process of treating a shaped mass comprising polymerized methyl methacrylate and containing voids, which process comprises subjecting said shaped mass to a temperature of about 140° C. and to a pressure of about 3000 pounds per square inch while said mass is immersed in an aqueous solution of about 3.5 molar strength of sodium acetate.

2. A process of treating a shaped mass comprising polymerized methyl methacrylate and containing voids, which process comprises subjecting said shaped mass to a temperature of about 140° C. and to a pressure of about 3000 pounds per square inch while said mass is immersed in an aqueous solution of about 3.5 molar strength of sodium acetate, cooling below the softening temperature of the said mass while maintaining the pressure, and then releasing the pressure.

3. A process of treating a composition comprising a polymeric ester of methacrylic acid and a monomeric ester of methacrylic acid which process comprises subjecting said composition to a temperature of between 40–150° C. and to a pressure of between 100 and 3000 pounds per square inch, while said composition is immersed in an inert aqueous solution of at least 1.5 molar strength of a water-soluble inorganic salt selected from the group consisting of sodium chloride, sodium acetate, sodium sulphate, sodium thiosulphate, calcium chloride, magnesium chloride, magnesium sulphate and sodium alum.

4. A process of treating a composition comprising a polymeric ester of methacrylic acid and a monomeric ester of methacrylic acid which process comprises subjecting said composition to a temperature of between 40–150° C. and to a pressure of between 100 and 3000 pounds per square inch, while said composition is immersed in an inert aqueous solution of at least 3.5 molar strength of sodium acetate.

5. A process of treating a composition comprising a synthetic resin selected from the group consisting of the polymers and copolymers of esters of methacrylic acid, which process comprises subjecting said composition to a temperature of between 40–150° C. and to a pressure of between 100 and 3000 pounds per square inch while said composition is immersed in an inert aqueous solution of at least 1.5 molar strength of a water-soluble salt selected from the group consisting of sodium chloride, sodium acetate, sodium sulphate, sodium thiosulphate, calcium chloride, magnesium chloride, magnesium sulphate and sodium alum.

RICHARD E. LEARY.
BARNARD M. MARKS.